Sept. 2, 1958    N. F. HARTLE    2,850,033
AUTOMATIC AIR VENT VALVE
Filed May 5, 1953

INVENTOR.
Norman F. Hartle

BY Charles F. Kaegebehn
ATTORNEY

United States Patent Office 2,850,033
Patented Sept. 2, 1958

2,850,033

AUTOMATIC AIR VENT VALVE

Norman F. Hartle, Sayreville, N. J., assignor to National Lead Company, New York, N. Y., a corporation of New Jersey Application May 5, 1953, Serial No. 353,100

1 Claim. (Cl. 137—197)

The present invention relates in general to valves, and more especially to an improved automatic air vent valve for heating systems.

In most types of hot water and steam heating systems accumulations of air occur in the pipes of the system and, if not removed, invariably decrease the efficiencies of the systems and, not infrequently, interrupt the operation thereof.

A great many varieties of air vent valves are in use, and a few of these are of the automatic type, but in general these earlier valves are designed for low pressure and low temperature applications and, due to the mechanical features embodied therein, are not applicable to high temperature and pressure operations, and when so used are prone to plug up or stick.

An object, therefore, of the present invention is to provide an improved automatic air vent valve which is relatively inexpensive, which will operate successfully at high temperatures and pressures and which is not subject to malfunctioning.

A further object of the invention is to provide an improved air vent valve having no moving parts.

A still further object of the invention is to provide an improved air vent valve wherein a superior hygroscopic composition serves as the fluid flow control means of the valve.

Other objects, features and advantages of the invention will more fully appear from the following detailed description in conjunction with the accompanying drawing which illustrates a single embodiment of the invention and in which.

The improved air vent valve of this invention is, as shown, of simple and economical construction, the few metal parts of the valve being of such mechanical structure that they may be economically made on a quantity production basis, as for example by means of automatic screw machines and the like.

Figure 1:
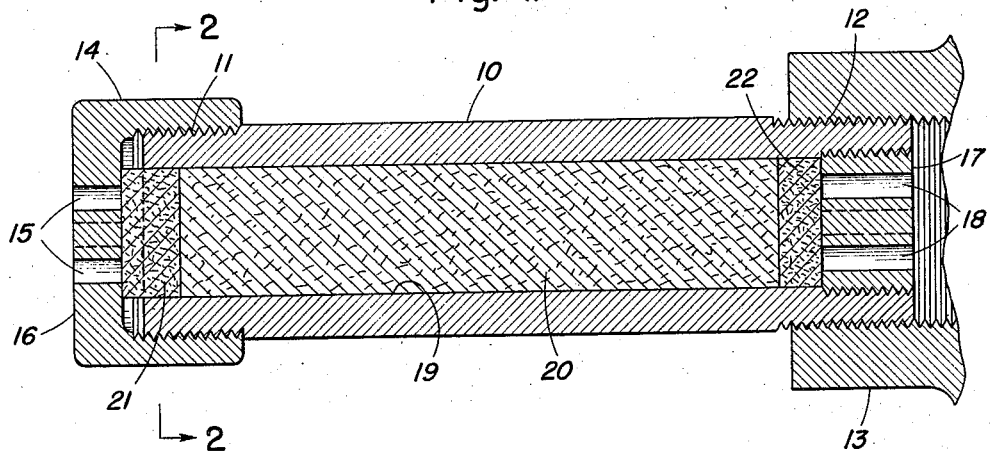
Figure 1 is a sectional view of the valve on the longitudinal axis thereof.
Figure 2:
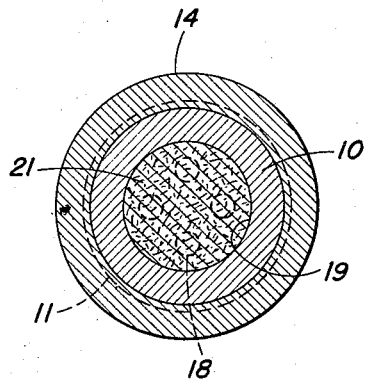
Figure 2 is a transverse section of the valve on line 2—2 of Figure 1.

Referring to Figure 1, the valve comprises a tubular metal body 10 which has the general structural characteristics of a pipe nipple and is preferably formed of brass although bronze, wrought iron and other suitable metals may be used.

Each end of the valve body 10 is provided with external pipe threads 11 and 12 respectively, the threaded end 12 of the valve body 10 being adapted to be threadedly secured in an outlet of a heating system as indicated generally at 13. The externally threaded end 11 of the valve body 10 is provided with a pipe cap 14 which has a plurality of holes 15, preferably 4 in number, drilled through the end-wall 16 thereof so as to connect the interior of the valve body 10 with the atmosphere.

The opposite threaded end 12 of the valve body 10 is also threaded internally to receive an externally threaded pipe plug 17 which is also provided with a plurality of holes 18, preferably 4 in number, for connecting the interior of the valve body 10 with the interior of the heating system 13.

Although the above described screw threaded connections of the valve body 10 are satisfactory for most applications of the air vent valve, and especially for low temperature and low pressure systems such as encountered in domestic heating systems, it is within the purview of the invention to use welded connections at these respective points, particularly in industrial applications of the valve wherein high temperatures and pressures are encountered. In this connection it is noteworthy that the valve of this invention operates successfully over a temperature range from about 32° F. to about 800° F. and at pressures as high as 1000# per square inch.

The interior or bore 19 of the valve body 10 embodies the fluid flow control means of this invention which comprises a composite packing 20 comprising a mixture of a hygroscopic material and a filler material, the purpose of the latter being to maintain the hygroscopic material in a relatively porous condition when dry.

The hygroscopic material is of a nature such that it is capable of expanding many times its original dry volume when subjected to moisture. A preferred hygroscopic material for use in the valve body 10 is bentonite which is a soft porous moisture absorbing rock composed essentially of clayey minerals as montmorillonite having the general formula $Al_4(Si_8O_{20})(OH)_4 \cdot xH_2O$, and capable of expanding, when wetted, to substantially ten times its dry volume; and to contract upon drying to substantially its original dry volume.

The aforementioned filler material which is mixed with the bentonite to insure the porosity of the packing when dry or substantially dry is preferably a non-moisture absorbing mineral fiber such as asbestos fibers or shredded asbestos.

The composite packing 20 of the valve comprises a mixture of bentonite and asbestos. The ratios of bentonite to asbestos fibers may vary from about 2 to about 4, the preferred ratio, however, being about 3 on a volume basis. The mixture of bentonite and asbestos fibers is packed into the bore 19 of the valve at a pressure sufficient to approximately double the normal uncompacted density of the mixture. The packing 20 substantially fills the bore of the valve except that space is provided between each end of the packing and the respective closure means at opposite ends of the valve, that is to say, the pipe cap 14 and the pipe plug 17, to accommodate retainers 21 and 22 respectively which serve to prevent the packing from entering the holes in the respective closure means at opposite ends of the valve.

Normally, that is to say, at temperatures within the range of from 32° F. to 800° F. and at pressures as high as 1000# per square inch, the packing retains its form or, at most, is in a semi solid or highly viscous state, and consequently the packing will not enter the apertures in the cap and pipe plug respectively. However, if higher temperatures and pressures were to be used, the packing might become sufficiently soft to flow into the apertures of the aforesaid cap and end plug, and consequently the retainers 21 and 22 are provided against this contingency. The retainers must necessarily be sufficiently porous to permit unrestricted flow of hot air and steam therethrough and sufficiently firm to preclude blocking the apertures of the cap and plug and to these ends are formed preferably of woven asbestos, each retainer having substantially the form and mechanical structure of a relatively thick wad of woven asbestos.

In assembling the elements of the valve the woven asbestos wad 21 is inserted into the bore 19 of the body member at the left hand end thereof as seen in Figure 1, and the pipe cap 14 is secured on the corresponding end of the valve body 10. The bore of the latter is then filled with the composite packing 20, comprising preferably 3 parts bentonite to 1 part asbestos fibers, which is pressed into the bore of the casing at a pressure such as to about double the normal loose density of the packing material. The asbestos retainer wad 22 is then inserted into the right hand end of the valve casing 10 whereupon the apertured pipe plug 17 is screwed into the internally threaded end of the casing against the retainer wad 22. After the valve has been assembled, it is installed in a heating system by screwing the externally threaded end 12 of the valve casing into an internally threaded outlet of the heating system 13 as indicated in the drawing.

Normally, that is to say when the heating system is inoperative, the composite packing in the valve is dry and consequently relatively porous. Hence, upon starting up the heating system, any dry air in the system is free to pass out of the system by way of the air vent valve. However, as soon as any steam or hot water begins to enter the packing of the valve, the packing promptly swells up to many times its dry volume, thereby effectively sealing the valve against further passage of hot water or steam therethrough. The valve remains sealed as long as any moisture remains in the composite packing. However, when the heating system is shut down and the hot water or steam ceases to flow through the system, moisture is no longer brought into contact with the packing, and consequently the composite packing dries out and shrinks substantially to its original volume, the asbestos filler material serving then to maintain the packing in a sufficiently porous condition to permit dry air to pass relatively freely therethrough.

From the foregoing description, it will be evident that the improved automatic air vent valve of this invention is of relatively inexpensive construction and is characterized by no moving parts and superior fluid flow control means which assure successful operation of the valve over an extended temperature range and at extremely high pressures which make the improved valve especially applicable for industrial uses.

While this invention has been described and illustrated by the examples shown, it is not intended to be strictly limited thereto, and other variations and modifications may be employed within the scope of the following claim.

I claim:

An automatic air relief valve for a radiator or the like comprising the combination: a valve casing having an axial bore, a cap on the outboard end of said casing, said cap having an aperture constituting a passage between the axial bore of said casing and the atmosphere, a plug on the inboard end of said casing, said plug having an aperture constituting a passage between the radiator and the axial bore of said casing, a hygroscopic fluid-flow control element in the axial bore of said casing, and asbestos wads interposed between opposite ends respectively of said hygroscopic element and the corresponding cap and end plug of said valve casing, said hygroscopic element comprising a composite mixture of bentonite and asbestos in the ratio of 2 to 4 parts bentonite to 1 part asbestos on a volume basis, said hygroscopic element being arranged to fill the axial bore of said casing between said asbestos wads and to seal off the axial bore of said casing against the flow of fluid from said radiator through the aperture of said end plug to the atmosphere.

References Cited in the file of this patent

UNITED STATES PATENTS

| | | |
|---|---|---|
| 1,365,768 | Cotton et al. | Jan. 18, 1921 |
| 2,331,431 | Simoneau | Oct. 12, 1943 |
| 2,493,604 | Walters | Jan. 3, 1950 |
| 2,601,216 | White et al. | June 17, 1952 |
| 2,713,871 | Kroder | July 26, 1955 |
| 2,727,001 | Rowe | Dec. 13, 1955 |

OTHER REFERENCES

Bentonite: Its Properties, Mining, Preparation, and Utilization. Technical Paper 609 U. S. Dept. of the Interior. Published by the U. S. Government Printing Office: 1940. Page 44 relied upon.